United States Patent
Topp et al.

(10) Patent No.: US 11,858,430 B2
(45) Date of Patent: Jan. 2, 2024

(54) BACKLIT DECORATIVE SURFACE, PARTICULARLY FOR THE INTERIOR FINISHING OF MOTOR VEHICLES

(71) Applicant: EISSMANN AUTOMOTIVE DEUTSCHLAND GMBH, Bad Urach (DE)

(72) Inventors: Jennifer Topp, Pfullingen (DE); Norman Eitel, Eningen (DE)

(73) Assignee: Eissmann Automotive Deutschland GmbH, Bad Urach (DE)

( * ) Notice: Subject to any disclaimer, the term of this patent is extended or adjusted under 35 U.S.C. 154(b) by 583 days.

(21) Appl. No.: 17/049,539

(22) PCT Filed: Apr. 25, 2019

(86) PCT No.: PCT/EP2019/060594
§ 371 (c)(1),
(2) Date: May 11, 2021

(87) PCT Pub. No.: WO2019/214957
PCT Pub. Date: Nov. 14, 2019

(65) Prior Publication Data
US 2021/0291754 A1    Sep. 23, 2021

(30) Foreign Application Priority Data
May 8, 2018 (DE) .................. 10 2018 111 072.3

(51) Int. Cl.
*B60R 13/02* (2006.01)
*B23K 26/0622* (2014.01)
(Continued)

(52) U.S. Cl.
CPC .......... *B60R 13/02* (2013.01); *B23K 26/0622* (2015.10); *B23K 26/386* (2013.01);
(Continued)

(58) Field of Classification Search
CPC ............. B23K 26/0622; B23K 26/386; B23K 26/402; B32B 3/266; B32B 7/12;
(Continued)

(56) References Cited

U.S. PATENT DOCUMENTS

| | | | |
|---|---|---|---|
| 6,382,821 B1 * | 5/2002 | Heyer | B44C 1/105 362/509 |
| 2017/0206831 A1 * | 7/2017 | Schmittat | B60R 13/0256 |
| 2019/0283667 A1 | 9/2019 | Eitel et al. | |

FOREIGN PATENT DOCUMENTS

| | | |
|---|---|---|
| DE | 102004039938 | 3/2005 |
| DE | 102006058257 | 6/2008 |

(Continued)

OTHER PUBLICATIONS

English machine translation of DE 202017100781U1 (Year: 2017).*

*Primary Examiner* — Anne M Hines
(74) *Attorney, Agent, or Firm* — Mark Wisnosky

(57) ABSTRACT

The invention relates to a planar decorative material (11) comprising perforations (12), for interior fittings, in particular for the automobile industry, which decorative material serves to be illuminated on the rearward face (13) thereof, by an illumination means (18), and allows a portion of the light from the illumination means (18) to pass from the rear face (13) of the decorative material (11), through the perforations (12), to the visible side (14) of the decorative material (11), wherein a film (20) is adhesively bonded to the rear face (13) of the decorative material (11) and the perforations (12) extend from the rear face (13) of the decorative material (11) as far as the visible side (14) thereof, but not through the film (20).

Figure 1:
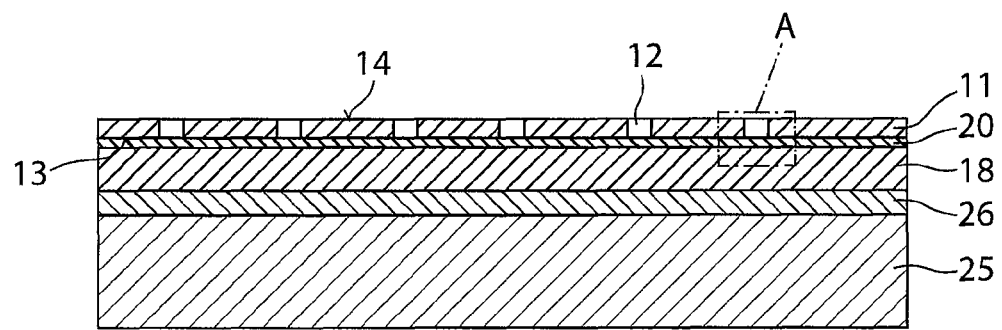

The present invention also relates to a production method.

16 Claims, 2 Drawing Sheets

(51) Int. Cl.
 *B23K 26/386* (2014.01)
 *B23K 26/402* (2014.01)
 *B32B 3/26* (2006.01)
 *B32B 7/02* (2019.01)
 *B32B 27/08* (2006.01)
 *B32B 27/40* (2006.01)
 *B32B 38/04* (2006.01)
 *F21V 8/00* (2006.01)
 *B23K 103/00* (2006.01)
 *B23K 103/16* (2006.01)

(52) U.S. Cl.
 CPC ............ *B23K 26/402* (2013.01); *B32B 3/266* (2013.01); *B32B 7/02* (2013.01); *B32B 27/08* (2013.01); *B32B 27/40* (2013.01); *B32B 38/04* (2013.01); *G02B 6/0051* (2013.01); *G02B 6/0055* (2013.01); *B23K 2103/172* (2018.08); *B23K 2103/34* (2018.08); *B23K 2103/38* (2018.08); *B23K 2103/42* (2018.08); *B32B 2038/047* (2013.01); *B32B 2307/412* (2013.01); *B32B 2307/414* (2013.01); *B32B 2307/732* (2013.01); *B32B 2605/003* (2013.01); *B60R 2013/0287* (2013.01)

(58) Field of Classification Search
 CPC ......... B32B 27/08; B32B 27/40; B32B 38/04; G02B 6/0051; G02B 6/0055
 See application file for complete search history.

(56) References Cited

FOREIGN PATENT DOCUMENTS

| | | |
|---|---|---|
| DE | 102007006201 | 8/2008 |
| DE | 102010043486 | 5/2011 |
| DE | 102013202223 | 8/2014 |
| DE | 102013012201 | 1/2015 |
| DE | 102011082344 | 4/2015 |

\* cited by examiner

The present invention relates to a backlightable decorative surface, in particular for the interior furnishing of motor vehicles.

In the field of the interior fittings of vehicles, it is conventional to laminate carrier parts such as dashboards, interior door panels, vehicle roof linings or central consoles using planar decorative materials such as leather, artificial leather or alcantara or other textiles. The planar decorative material is frequently not laminated directly onto the carrier part, but instead a spacer fabric or foam is provided between the carrier part and the decorative material, in order to create an attractive haptic impression.

In general, solvent-based, dispersion or hot melt adhesives are used for adhesively bonding the layers.

In recent years, a trend towards backlightable surfaces has developed. In this case, in principle an light guide is applied to a carrier material, which light guide is illuminated by means of a light source, such as an LED lamp. An at least partially transparent layer is provided above the light guide. In night operation, i.e. when the light source is activated, the light is guided from the light source through the light guide and then passes through the partially transparent layer, and into the interior of the motor vehicle, at the points of said layer that are permeable for the light source. In order to achieve a uniform spatial light distribution, a diffuser is frequently provided between the light guide and the layer that is partially permeable to light.

Backlit or backlightable surfaces of this kind make it possible, in particular in darkness, to achieve attractive basic illumination in the interior of the vehicle which is almost invisible in light.

In the field of sophisticated vehicle interior fittings, there is a desire to also provide backlit surfaces with high-quality non-transparent or translucent decorative materials such as leather or artificial leather. Since decorative materials of this kind are non-transparent or non-translucent, it is necessary to introduce holes or perforations into said materials in order that the light in the light guide on the rear face of the decorative material can pass through the decorative material on the visible side.

If, however, holes and perforations are introduced into the decorative material and adhesive is subsequently applied to the rear face of the decorative material in order to adhesively bond said decorative material to the diffuser or light guide, a portion of the adhesive penetrates into the holes or perforations in the decorative material. Since the adhesive is located in part in a perforation between the light guide and the visible side, and thus the adhesive is also "backlit", said adhesive is visible from the visible side of the decorative material, which appears unattractive, At the same time, however, the different amounts and distribution of the adhesive in the perforations also results in the intensity and distribution of the light transmitted through the perforations fluctuating from perforation to perforation, such that it is impossible to achieve uniform illumination.

A further disadvantage is that the stability of the decorative material, in particular leather, increasingly reduces when a plurality of perforations is introduced in a specific pattern, such that the decorative material tends to warp, and the desired perforation pattern can thus no longer be adhesively bonded to the light guide without interruptions.

It is furthermore desirable for the production of backlit decorative materials of this kind to meet the requirements of a production process in industrial series manufacturing.

DE 20 2012 100 538 U1 discloses a trim part with perforations, which consists of a carrier and a decorative layer made of wood. As the perforations are introduced into the compound by means of a UV laser and the perforations are to extend only in the decorative layer, but not in the carrier material, a UV reflector is provided between the carrier and the decorative layer, which is to prevent UV light from entering the carrier during the lasering.

DE 10 2013 104 138 B3 teaches a method for introducing a weakened line by material removal on a fibrous cover material.

DE 10 2008 054 721 B3 teaches a method for producing a light-scattering decorative compound, in which a transparent cover layer is applied to a visible side of a decorative layer, and the compound subsequently is perforated from the rear face of the decorative compound.

A method for introducing weakened lines into a vehicle interior trim part with a decorative layer made of leather is also known from WO 2005/049261 A1.

The object of the present invention is that of providing a backlightable decorative material that has optically attractive, defined through-illumination and at the same time meets the requirements of a production process in industrial series manufacturing. A further object of the present invention is that of specifying a production process relating thereto.

This object is achieved by the features as described below, and, in the attached claims.

The planar decorative material according to the invention comprises perforations and is illuminated on the rearward face thereof, by an illumination means, and allows a portion of the light from the illumination means to pass from the rear face of the decorative material, through the perforations, to the visible side of the decorative material, wherein a film is adhesively bonded to the rear face of the decorative material and the perforations extend through the entire decorative material, as far as the visible side thereof, but not through the film.

The fact that the film is adhesively bonded to the rear face of the decorative material means that the film achieves stabilization and fixing of the decorative material, which material comprises a plurality of perforations for the through-illumination. Since, in the process described above, the film is first adhesively bonded to the rear face of the decorative material, and only then are the perforations introduced in the decorative material, but not in the film, means that the decorative material comprising the perforations cannot warp with respect to the film during the production process. The film stabilizes the entire compound structure.

If the plurality of perforations were first introduced into the decorative material, in particular leather, and the perforated decorative material only then adhesively bonded to the film, the unstable perforated decorative material then could not be adhesively bonded to the film in a manner that is entirely free of interruptions or without any stretching or traction, which would also undesirable for optical reasons. Furthermore, the adhesive could penetrate into the perforations.

The film, which is directly bonded to the rear face of the decorative material, not only achieves stabilization of the perforated decorative material, but rather also functions as a diffuser for the light of the illumination means which passes through the film and then through the perforation in the decorative material and subsequently emerges on the visible side of the decorative material. As a result, particularly attractive illumination can be achieved, since the perforation is illuminated in a more planar manner by the more diffuse illumination brought about by the film, and it is thus possible to achieve particularly homogenous illumination in which the illumination pattern changes depending on the viewing angle.

The film may be a conventional transparent or translucent film comprising an adhesive coating or hot melt adhesive film, in particular based on polyurethane or esters, or a thermoplastic adhesive film.

The film may be colorless or colored.

In a preferred variant, the film is a latent reactive film, in particular an adhesive film produced on the basis of polyurethane, comprising an integrated second component which begins to react with the first component, and thus achieves high-strength adhesive bonding, in the case of activation at a temperature T2 and a pressure p2. The second component is preferably an isocyanate which is preferably provided in encapsulated form.

According to the invention, the perforation is introduced by means of a laser, wherein a film is first laminated onto the rear face of a decorative material and subsequently a perforation is introduced, by means of the laser, on the compound structure consisting of the decorative material and film, which perforation completely passes through the decorative material, from the visible side to the rear face, without the film being perforated. The perforation is preferably introduced from visible side of the decorative material.

A UV laser, preferably having an emission wavelength of between 320 and 400 nm, preferably between 340 nm and 380 nm, and particularly preferably approximately 355 nm, is used as the laser.

A pulsed laser having a pulse frequency of up to 120 kHz Is preferably used.

It has very surprisingly been found that, although a laser of this kind can introduce the desired exact perforation in the decorative material, in particular leather, the film is not perforated, however, and the film thus remains intact. As a result, exact perforation through the entire decorative material, including the rear face thereof, is achieved, and the film that is adhesively bonded to the rear face, in particular the latent reactive adhesive film described above, covers the resultant hole from below without substantially impairing the film material. Since the film is not perforated of substantially damaged by the laser treatment, said film can both stabilize the perforated decorative material and function as a diffuser for the light of the illumination means.

The laser beam is moved along a specific path, over the visible side of the decorative material. Since the laser beam is pulsed, when the laser beam is moved along the path material is removed at points, as the desired locations, until, by means of multiple repetition of the movement of the laser along the path, the leather is perforated at the desired point.

The laser is subsequently deactivated.

Since the film has some degree of resistance to the laser radiation used, said film is not, or is only insignificantly, damaged, even if the laser pulse strikes the film after all.

The irradiation of the decorative material can be ended empirically or using a hollow chamber, as described in DE 10 2016 105 567 A1, or by means of a second laser, as described in the older application DE 10 2017 107 935.

Since the rear face of the decorative material is adhesively bonded to the film or is first adhesively bonded, and only then are the perforations introduced into the decorative material, no adhesive can penetrate into the perforations and thus the beam path cannot experience distortion in the perforation, with the result that optically appealing and reproducible through- or backlighting is achieved in the region of the perforations.

According to the invention, the film is preferably an adhesive film, in order that it can be adhesively bonded to the rear face of the decorative material. In a first preferred variant, the film is coated with a conventional, non-reactive hot melt adhesive, for example based on polyurethane.

In a preferred embodiment, the adhesive film is a latent reactive adhesive film, i.e. an adhesive film that is an adhesive film which is activatable upon temperature and/or pressure increase and which can be permanently adhesively bonded or laminated under the action of a pressure p2 and/or a temperature increase to a temperature T2. Under these "activation conditions for the permanent adhesive bonding", i.e. the temperature increase to a temperature T2 and/or the action of a pressure p2, the film is very tacky and can then be laminated onto the illumination means and permanently crosslinked throughout.

The activation is particularly preferably achieved by increasing the temperature to T2 and increasing the pressure to p2.

Below the "activation conditions for the permanent adhesive bonding", the temperature T2 and the pressure p2, the latent reactive adhesive film may not be tacky, which is the case for example below a temperature T1 and below a pressure p1. Above the temperature T1 and the pressure p1, which together form the "activation conditions for prefixing", the adhesive film is slightly tacky, specifically sufficiently tacky that it can be laminated to the rear face of the leather, within the context of prefixing, and adheres to said rear face. Once the adhesive film is laminated to the leather at the temperature T1 and the pressure p1, the compound structure can be cooled to room temperature again, the decorative material perforated, and stored under normal pressure.

In general, the decorative material and film are cut to size prior to the prefixing and are only then prefixed.

In general, the blank consisting of perforated decorative material and film can be stored in a cool, dry place for a long period of time, of up to six months, and optionally transported in order to then be adhesively bonded to the illumination means under the action of a higher temperature T2 than the temperature T1 and/or a higher pressure p2 than the pressure p1, specifically under the activation conditions for the permanent adhesive bonding.

Alternatively, the blank consisting of the decorative material and film is cooled and stored following prefixing, and only at a later time are the perforations introduced into the decorative material, in the blank, and the compound structure comprising the decorative material is laminated onto the illumination means, optionally being additionally temporarily stored, under the activation conditions T2 and/or p2 for the permanent adhesive bonding.

Since it is possible to store the decorative materials, coated with the latent reactive adhesive film, for months, and to activate said adhesive film and laminate said decorative material onto the relevant part, specifically the illumination means, only at a later time, under the applied pressure p2 and increased temperature T2, the requirements of industrial series manufacture are met.

The perforated decorative material that is laminated onto the illumination means by the film can subsequently be adhesively bonded to the lower face of the illumination means via a carrier element such as a door panel, a spacer fabric or a foam.

The temperature T1 for the prefixing, i.e. the temperature at which the film is slightly tacky and can be prefixed, is generally below 60° C., preferably between 40° C. and 55° C. Depending on the adhesive film used, however, the temperature can also be higher or lower. The pressure p1 for the prefixing is generally approximately up to 20 N/cm², preferably between 10 N/cm², and 20 N/cm², and particularly preferably approximately 15 N/cm².

The activation temperature T2 for the permanent adhesive bonding is generally at least 60° C. and preferably between 70° C. and 110° C. At these temperatures, optimal almost undetachable adhesive bonding can be achieved without the decorative material being damaged by the heat input. Depending on the adhesive film used, however, the temperature may also be higher or lower.

The applied pressure p2 for the crosslinking activation (permanent adhesive bonding) is between 0.5 N/cm² and 25 N/cm², and preferably between 0.5 N/cm² and 2.0 N/cm², depending on the material to be pressed. Said applied pressures are sufficiently high to allow for the prefixing or the crosslinking activation, but sufficiently low that the decorative material is not damaged.

After the activation, the adhesive bond must still fully crosslink. In general, the necessary (secondary) crosslinking time can be reduced by a longer activation time.

In general, the secondary crosslinking time is between 24 and 48 hours.

As a result of the temperature and/or pressure increase to T2 and/or p2, the film that was only prefixed to the decorative material in the first step can now be permanently adhesively bonded thereto.

The decorative material is in particular a planar soft material such as leather, artificial leather, plastics material, alcantara or a textile material.

The decorative material is generally optically opaque. The layer thickness of the decorative material is preferably between 0.5 mm and 3.0 mm, and particularly preferably between 0.8 mm and 2.0 mm.

In principle, a very wide range of perforations can be introduced into the decorative material. In a first preferred embodiment, the perforations are mutually spaced at an equal spacing in each case. In a further preferred embodiment the spacings of the perforations are different from one another.

Any desired shapes of the perforations are possible, e.g. circular perforations, rectangular or triangular perforations, star-shaped perforations, square perforations, letters, logos, etc. The larger the perforation, the more light passes through a perforation, and the brighter the backlighting is.

A variety of different perforations can also be combined.

A brighter central region of the backlighting can for example be achieved in that the perforations in the center are larger and/or at a smaller spacing from one another than in the edge region.

In general, the diameter of a perforation is intended to be between 0.5 mm and 5 mm, preferably between 0.8 mm and 3 mm, in order to achieve a minimum passage of light through a perforation, but at the same time to also retain the material properties, optics, haptics and flatness of the decorative material.

In principle, the perforations are cylindrical in shape, i.e. the perforations extend at a right angle to the surface of the decorative material. In this case, the perforations may all have the same cross section or different cross sections.

The illumination means comprises a light source such as an LED lamp. Furthermore, the illumination means may also comprise an light guide, for example consisting of silicone or a plastics material, a light diffuser, and a reflector.

The light diffuser, which may be a non-woven fabric or another light-scattering textile, is generally arranged on the side of the film remote from the decorative layer, and ensures that diffuse light is shone into the perforations.

A reflector is generally arranged on the other side of the light guide, which reflector causes the light to be guided along the light guide and to reach all the perforations.

The film is preferably adhesively bonded to the upwardly facing side of a diffuser or of a transparent or semitransparent carrier, which is in turn located on or above the upwardly facing side of the light guide.

The diffuser or transparent or semitransparent carrier may be adhesively bonded to the light guide.

Preferably, however, the light guide and the diffuser or carrier are separated from one another by a small gap, and the diffuser or carrier and light guide are spot-welded at just a few points. This can achieve homogeneous irradiation of the rear face of the decorative material by the light guide.

The film can also or additionally bring about scattering of the light.

A light source, e.g. an LED lamp, the light of which is shone into the light guide, is located to the side of the light guide.

Of course, the components can also be arranged in another manner.

The invention will be described in more detail in the following, with reference to an embodiment.

Figure 2:
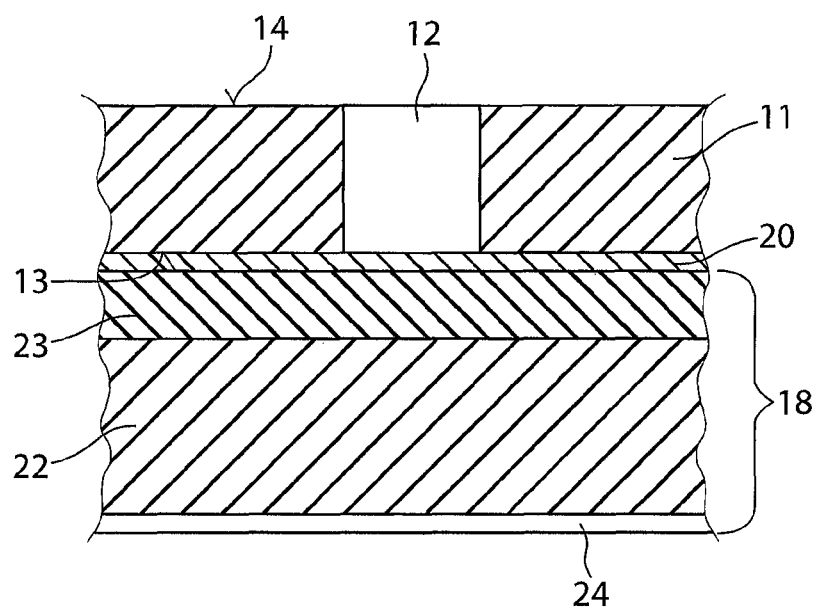
Figure 3:
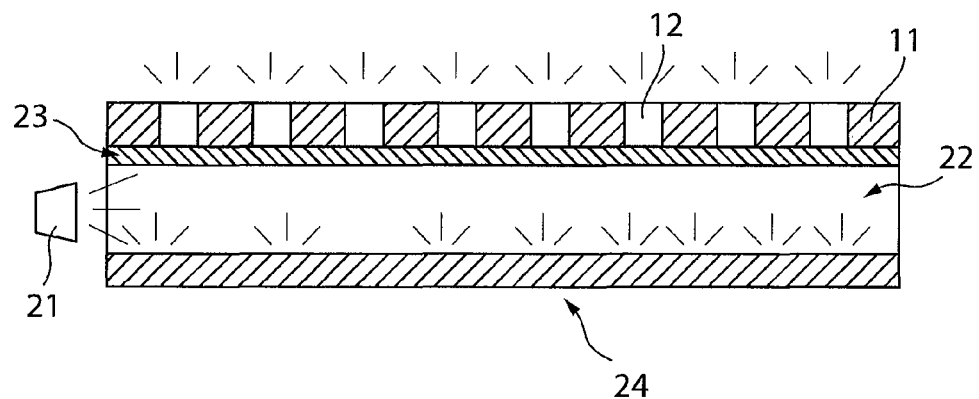
Figure 4:
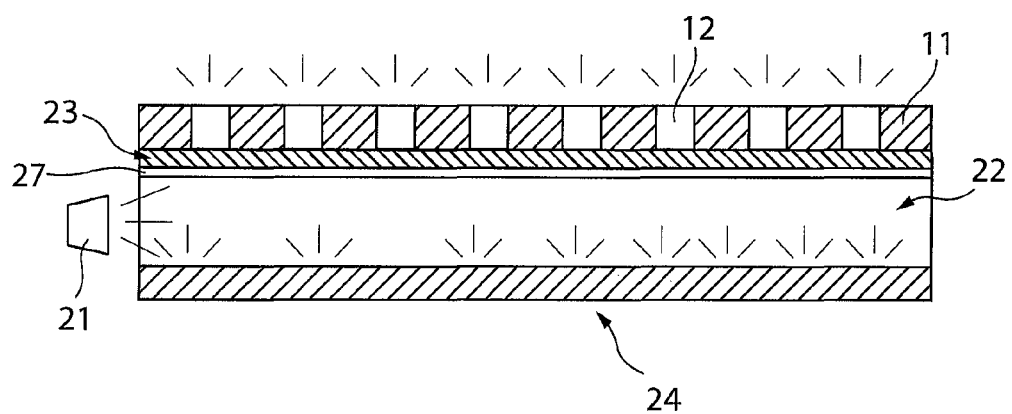

In the drawings:

FIG. 1 is a schematic view of the layer structure of a door panel comprising a backlit decorative layer, FIG. 2 is an enlarged view of region A from FIG. 1, in which the film is also visible, FIG. 3 shows the general operating principle of the backlighting, and FIG. 4 shows a further variant of the general operating principle of the backlighting comprising a gap.

The visible side 14 of the decorative material 11 in FIGS. 1 and 2 faces upwards into the vehicle interior.

In the enlarged view in FIG. 2, it can be seen that the rear face 13 of the decorative material 11 is adhesively bonded to the film 20 over the entire surface thereof.

The decorative material 11 and the film 20 can be cut to size prior to prefixing.

The film 20 is preferably a latent reactive adhesive film which can be converted into the slightly tacky state, for prefixing at a first temperature T1 and at a first applied pressure p1 that are approximately 50° C. and 5 N/cm². In this state, the side of the film 20 that faces upwards in FIG. 2 is slightly adhesively bonded (prefixed) to the rear face 13 of the decorative material 11. This prefixing is sufficient for preventing detachment of the adhesive film from the decorative material 11 or slipping during storage or during the perforation process.

For example, the film obtainable from H. B. Fuller, under the name Flexee™ EM9002, can be used as the film 20, wherein a layer thickness of 100 micrometers is preferred.

Following prefixing, the perforations 12 can then be introduced, by means of a UV laser, into the blank constating of the decorative material 11 and film 20. Within the context of the invention, it has been found that a UV laser having a wavelength of 355 nm allows for complete perforation of the leather 11, without the film 20 that is adhesively bonded to the rear face 13 of the leather 11 also being perforated. The method according to the invention thus achieves selective perforation of the leather 11 in the leather/film compound structure. In this case, the perforations 12 extend through the decorative material 11, but not through the film 20.

In FIGS. 1 and 3, the spacings of the perforations 12 are different from one another in part.

The perforated blank can then be activated to the activation temperature T2 of 75° C. to 110° C., optionally after storage of up to six months, and the perforated blank can then be permanently adhesively bonded to the illumination means 18 under an applied pressure of 5 to 20 N/cm². A rigid adhesive bond between the film 20 and the illumination means 18 is achieved thereby. Under the activation conditions for the permanent adhesive bonding, it is simultaneously possible to also achieve complete crosslinking of the adhesion between the decorative material 11 and the film 20, which adhesion is still incomplete from the prefixing.

If desired, a spacer fabric or foam 26 can subsequently also be laminated onto the side of the illumination means 18 remote from the decorative material 11, and the compound structure can then be adhesively bonded to a carrier part 25 of a door panel by means of the lower face of the spacer fabric or foam 26. Of course, it is also possible for the spacer fabric 26 to first be adhesively bonded to the carrier part 25 and for the compound structure consisting of the decorative material 11/film 20/Illumination means 18 to then be adhesively bonded thereto. It is likewise possible for the spacer fabric or foam 26 to also be omitted in the layer structure.

The illumination means 18 comprises a light source 21 such as an LED lamp, a flexible or rigid light guide 22, a reflector 24 and a diffuser 23. The diffuser 23 is planar and may be a non-woven fabric for example. Said diffuser renders diffuse the light source generated in the light source 21, and thus prevents directed dazzling light radiation.

In this variant, the diffuser 23 forms the upper outer face of the illumination means 18. If diffuse backlighting is not desired, the diffuser 23 can also be omitted.

In the variant according to FIG. 3, the diffuser 23 is adhesively bonded directly to the light guide 22.

In the variant according to FIG. 4, a gap 27 is provided between the diffuser 23 and the light guide 22, which gap brings about more homogeneous and more uniform irradiation than in the case of the structure according to FIG. 3. The gap 27 is generally achieved by means of the diffuser 23 and the light guide 22 being spot-welded at some points.

Instead of the diffuser 23, which may be a semitransparent carrier for example, a transparent carrier 25 can also be used.

We claim:

1. A Planar decorative material (11) comprising perforations (12), for interior fittings, in particular for the automobile industry, which decorative material serves to be illuminated on the rearward face (13) thereof, by an illumination means (18), and allows a portion of the light from the illumination means (18) to pass from the rear face (13) of the decorative material (11), through the perforations (12), to the visible side (14) of the decorative material (11), wherein a film (20) is adhesively bonded to the rear face (13) of the decorative material (11) and the perforations (12) extend from the rear face (13) of the decorative material (11) as far as the visible side (14) thereof, but not through the film (20), and,
   a. the film (20) is transparent or translucent, and,
   b. the film (20) is a hot-melt adhesive film, an adhesive film that is activatable under a temperature and/or pressure increase, or a thermoplastic adhesive film, and,
   c. the film (20) can be pre-laminated onto the rear face (13) of the decorative material (11) under the application conditions for the prefixing, specifically increasing the temperature to a temperature T1 that is less than a temperature T2, and/or a first pressure increase to a pressure p1 that is lower than or equal to a pressure p2, and the film can then be permanently adhesively bonded by an increase to the temperature T2 and/or the pressure p2.

2. Planar decorative material (11) according to claim 1, characterized in that the decorative material is a soft decorative material, and in particular leather, artificial leather, alcantara or a textile.

3. Planar decorative material (11) according to claim 1, characterized in that the film (20) is directly bonded to the rear face (13) of the decorative material (11).

4. Planar decorative material (11) according to claim 1, characterized in that the layer thickness of the film (20) is between 25 and 200 micrometers.

5. Planar decorative material (11) according to claim 1, characterized in that the layer thickness of the film (20) is between 70 and 130 micrometers.

6. Planar decorative material (11) according to claim 1, characterized in that the spacing between the perforations (12) in the decorative material (11) are the same or different, and/or in that the perforations (12) are all of the same shape or of different shapes and/or of the same size or different sizes and/or of the same cross section or different cross sections.

7. Planar decorative material (11) according to claim 1, characterized in that the illumination means (18) comprises a light source (21) and a light guide (22) and/or a diffuser (23) and/or a reflector (24).

8. A Planar decorative material (11) comprising perforations (12), for interior fittings, in particular for the automobile industry, which decorative material serves to be illuminated on the rearward face (13) thereof, by an illumination means (18), and allows a portion of the light from the illumination means (18) to pass from the rear face (13) of the decorative material (11), through the perforations (12), to the visible side (14) of the decorative material (11), wherein a film (20) is adhesively bonded to the rear face (13) of the decorative material (11) and the perforations (12) extend from the rear face (13) of the decorative material (11) as far as the visible side (14) thereof, but not through the film (20), and, the film (20) is an adhesive film produced on the basis of polyurethane, comprising an integrated second component which begins to react with the first component, and thus achieves high-strength adhesive bonding, in the case of activation at a temperature T2 and a pressure p2.

9. Planar decorative material (11) according to claim 8, characterized in that the film (20) is transparent or translucent.

10. Planar decorative material (11) according to claim 9, characterized in that the film (20) is a hot-melt adhesive film, an adhesive film that is activatable under a temperature and/or pressure increase, or a thermoplastic adhesive film.

11. Planar decorative material (11) according to claim 8, characterized in that the decorative material is a soft decorative material, and in particular leather, artificial leather, alcantara or a textile.

12. Planar decorative material (11) according to claim 8, characterized in that the film (20) is directly bonded to the rear face (13) of the decorative material (11).

13. Planar decorative material (11) according to claim 8, characterized in that the layer thickness of the film (20) is between 25 and 200 micrometers.

14. Planar decorative material (11) according to claim 8, characterized in that the spacing between the perforations (12) in the decorative material (11) are the same or different, and/or in that the perforations (12) are all of the same shape or of different shapes and/or of the same size or different sizes and/or of the same cross section or different cross sections.

15. Planar decorative material (11) according to claim 8, characterized in that the illumination means (18) comprises a light source (21) and an light guide (22) and/or a diffuser (23) and/or a reflector (24).

16. Planar decorative material (11) according to claim 1, characterized in that the layer thickness of the film (20) is between 70 and 130 micrometers.

* * * * *